(12) United States Patent
MacQueen et al.

(10) Patent No.: US 6,759,096 B2
(45) Date of Patent: Jul. 6, 2004

(54) METHOD FOR MAKING DIFFERENTIAL GLOSS COVERINGS

(75) Inventors: Richard C. MacQueen, Phillipsburg, NJ (US); Thomas E. Janini, Trenton, NJ (US); Anthony A. Parker, Newtown, PA (US)

(73) Assignee: Congoleum Corporation, Mercerville, NJ (US)

( * ) Notice: Subject to any disclaimer, the term of this patent is extended or adjusted under 35 U.S.C. 154(b) by 0 days.

(21) Appl. No.: 09/962,393

(22) Filed: Sep. 24, 2001

(65) Prior Publication Data

US 2003/0129369 A1 Jul. 10, 2003

(51) Int. Cl.[7] ................................................ C08F 2/46
(52) U.S. Cl. ...................... 427/494; 427/261; 427/333; 427/385.5; 427/500; 427/504; 427/506; 427/510; 427/511; 427/514; 427/519; 427/520; 427/552; 427/555; 427/558; 427/559; 427/595
(58) Field of Search ................................. 427/494, 261, 427/333, 558, 385.5, 500, 559, 504, 595, 506, 510, 511, 514, 519, 520, 552, 555

(56) References Cited

U.S. PATENT DOCUMENTS

| | | | |
|---|---|---|---|
| 2,801,185 A | 7/1957 | Iler | |
| 3,267,187 A | 8/1966 | Slosberg et al. | |
| 3,506,474 A | 4/1970 | Neuhaus et al. | |
| 3,639,160 A | 2/1972 | Nelson | |
| 3,956,530 A | 5/1976 | McKee, Jr. et al. | |
| 3,958,043 A | 5/1976 | McKee, Jr. et al. | |
| 3,958,054 A | 5/1976 | McKee, Jr. et al. | |
| 3,996,328 A | 12/1976 | Coffin et al. | |
| 3,999,940 A | 12/1976 | Freeman | |
| 4,008,349 A | 2/1977 | Ehrenfeld, Jr. et al. | |
| 4,015,036 A | 3/1977 | Haemer | |
| 4,022,643 A | 5/1977 | Clark | |
| 4,029,831 A | 6/1977 | Daunheimer | |
| 4,036,673 A | 7/1977 | Murphy et al. | |
| 4,059,709 A | 11/1977 | Conger et al. | |
| 4,066,813 A | 1/1978 | Winters et al. | |
| 4,068,030 A | 1/1978 | Witman | |
| 4,071,592 A | 1/1978 | Frisch | |
| 4,083,907 A | 4/1978 | Hamilton | |
| 4,086,377 A | 4/1978 | Barchi | |
| 4,089,296 A | 5/1978 | Barchi | |
| 4,089,724 A | 5/1978 | Bomboire | |
| 4,126,727 A | 11/1978 | Kaminski | |
| 4,130,939 A | 12/1978 | Toal | |
| 4,169,167 A | 9/1979 | McDowell | |
| 4,187,131 A | 2/1980 | Shortway et al. | |

(List continued on next page.)

FOREIGN PATENT DOCUMENTS

| EP | 1 228 813 A2 | 1/2002 |
|---|---|---|
| WO | WO 03/057458 A2 | 7/2003 |

OTHER PUBLICATIONS

U.S. patent application Ser. No. 09/489,420, MacQueen et al., filed Jan. 21, 2000.

U.S. patent application Ser. No. 09/765,713, MacQueen et al., filed Jan. 19, 2001.

(List continued on next page.)

*Primary Examiner*—Bernard Pianalto
(74) *Attorney, Agent, or Firm*—Pennie & Edmonds LLP

(57) ABSTRACT

The foregoing differential gloss covering comprises a backing substrate, an ink layer, and a cured top layer having a first surface portion with a first gloss and a second surface portion, made by the process comprising providing the backing substrate; depositing an ink formulation comprising a curing agent over at least a first area of a top side of the backing substrate to form said ink layer; coating the top side of the backing substrate with a radiation curable formulation to form a top curable layer; diffusing at least a portion of the curing agent into the top curable layer; curing the top curable layer to form the cured top layer and thereby forming a differential gloss covering having said first surface portion above the first area of said top of said backing substrate having the first gloss and the second surface portion having the second gloss that is different from said first gloss.

28 Claims, 3 Drawing Sheets

U.S. PATENT DOCUMENTS

| | | |
|---|---|---|
| 4,191,581 A | 3/1980 | Hamilton |
| 4,212,691 A | 7/1980 | Potosky et al. |
| 4,214,028 A | 7/1980 | Shortway et al. |
| 4,217,385 A | 8/1980 | Shortway et al. |
| 4,224,454 A | 9/1980 | McDowell et al. |
| 4,229,274 A | 10/1980 | Carlblom |
| 4,232,076 A | 11/1980 | Stetson et al. |
| 4,234,399 A | 11/1980 | McDowell et al. |
| 4,244,899 A | 1/1981 | Henshaw |
| 4,248,922 A | 2/1981 | Shortway et al. |
| 4,263,051 A | 4/1981 | Crawford et al. |
| 4,264,643 A | 4/1981 | Granata et al. |
| 4,273,819 A | 6/1981 | Schmidle et al. |
| 4,274,916 A | 6/1981 | Grose |
| 4,277,427 A | 7/1981 | Kaminski et al. |
| 4,278,483 A | 7/1981 | Mansolillo |
| 4,287,083 A | 9/1981 | McDowell et al. |
| 4,298,646 A | 11/1981 | Haemer et al. |
| 4,304,815 A | 12/1981 | Cugasi, Jr. |
| 4,309,452 A | 1/1982 | Sachs |
| 4,313,969 A | 2/1982 | Matthews et al. |
| 4,331,579 A | 5/1982 | Haemer |
| 4,337,296 A | 6/1982 | Varadhachary |
| 4,348,447 A | 9/1982 | Miller, Jr. et al. |
| 4,355,063 A | 10/1982 | Palmer et al. |
| 4,358,476 A | 11/1982 | Zimmer et al. |
| 4,361,626 A | 11/1982 | Boba et al. |
| D268,793 S | 4/1983 | Tejeda et al. |
| 4,388,760 A | 6/1983 | Aspy |
| 4,389,514 A | 6/1983 | Schmidle et al. |
| 4,391,686 A | 7/1983 | Miller et al. |
| 4,393,187 A | 7/1983 | Boba et al. |
| 4,401,611 A | 8/1983 | Mansolillo et al. |
| 4,405,657 A | 9/1983 | Miller, Jr. et al. |
| 4,418,109 A | 11/1983 | Miller, Jr. et al. |
| 4,421,784 A | 12/1983 | Troue |
| 4,440,826 A | 4/1984 | Witman |
| 4,443,505 A | 4/1984 | Ehrenfeld, Jr. |
| 4,450,194 A | 5/1984 | Kauffman et al. |
| 4,454,188 A | 6/1984 | Penta et al. |
| 4,456,643 A | 6/1984 | Colyer |
| 4,464,423 A | 8/1984 | LaBianca et al. |
| 4,467,007 A | 8/1984 | Elgie |
| 4,478,876 A | 10/1984 | Chung |
| 4,483,732 A | 11/1984 | Penta et al. |
| 4,483,884 A | 11/1984 | Troue |
| 4,485,123 A | 11/1984 | Troue |
| 4,491,616 A | 1/1985 | Schmidle et al. |
| 4,501,783 A | 2/1985 | Hiragami et al. |
| 4,522,958 A | 6/1985 | Das et al. |
| 4,526,910 A | 7/1985 | Das et al. |
| 4,530,856 A | 7/1985 | Kauffman et al. |
| 4,547,245 A | 10/1985 | Colyer |
| 4,609,431 A | 9/1986 | Grose et al. |
| 4,618,530 A | 10/1986 | Stetson |
| 4,652,470 A | 3/1987 | Das et al. |
| 4,675,212 A | 6/1987 | Wiley et al. |
| 4,677,004 A | 6/1987 | Das et al. |
| 4,680,204 A | 7/1987 | Das et al. |
| 4,689,259 A | 8/1987 | Miller, Jr. et al. |
| 4,699,820 A | 10/1987 | Herr, Jr. et al. |
| 4,717,620 A | 1/1988 | Bowen et al. |
| 4,761,306 A | 8/1988 | Clark et al. |
| 4,794,020 A | 12/1988 | Lussi et al. |
| 4,844,849 A | 7/1989 | Miller et al. |
| RE33,069 E | 9/1989 | Courtoy et al. |
| 4,931,331 A | 6/1990 | Owens |
| 4,958,399 A | 9/1990 | Toal et al. |
| RE33,599 E | 5/1991 | Courtoy et al. |
| 5,015,516 A | 5/1991 | Lussi et al. |
| 5,023,140 A | 6/1991 | Glotfelter et al. |
| 5,059,471 A | 10/1991 | McNally et al. |
| 5,077,112 A | 12/1991 | Hensel et al. |
| 5,080,954 A | 1/1992 | Mackey, Sr. et al. |
| H1029 H | 3/1992 | Reinhart |
| 5,104,929 A | 4/1992 | Bilkadi |
| 5,112,671 A | 5/1992 | Diamond et al. |
| 5,120,811 A | 6/1992 | Glotfelter et al. |
| 5,124,202 A | 6/1992 | Fernando et al. |
| 5,153,047 A | 10/1992 | Mackey, Sr. et al. |
| 5,165,967 A | 11/1992 | Theno et al. |
| 5,178,912 A | 1/1993 | Piacente et al. |
| 5,208,086 A | 5/1993 | Owens |
| 5,246,764 A | 9/1993 | LaPorte et al. |
| 5,252,655 A | 10/1993 | Parker et al. |
| 5,260,118 A | 11/1993 | Lussi et al. |
| 5,290,591 A | 3/1994 | Lussi et al. |
| 5,308,683 A | 5/1994 | Dees, Jr. et al. |
| 5,316,855 A | 5/1994 | Wang et al. |
| 5,336,693 A | 8/1994 | Frisch |
| 5,344,704 A | 9/1994 | O'Dell et al. |
| 5,348,760 A | 9/1994 | Parker et al. |
| 5,411,811 A | 5/1995 | Piacente et al. |
| 5,460,701 A | 10/1995 | Parker et al. |
| 5,494,729 A | 2/1996 | Henry et al. |
| 5,506,030 A | 4/1996 | Landers et al. |
| 5,531,944 A | 7/1996 | Frisch |
| 5,536,530 A | 7/1996 | Landers et al. |
| 5,536,571 A | 7/1996 | Pearson et al. |
| 5,543,173 A | 8/1996 | Horn, Jr. et al. |
| 5,571,588 A | 11/1996 | Lussi et al. |
| 5,585,415 A | 12/1996 | Gorzalski et al. |
| 5,618,577 A | 4/1997 | Pearson et al. |
| 5,627,231 A | 5/1997 | Shalov et al. |
| 5,645,889 A | 7/1997 | Potosky et al. |
| 5,648,407 A | 7/1997 | Goetz et al. |
| 5,679,443 A | 10/1997 | Barrows et al. |
| 5,712,018 A | 1/1998 | Frisch |
| 5,718,907 A | 2/1998 | Labarre |
| 5,728,332 A | 3/1998 | Frisch et al. |
| 5,733,630 A | 3/1998 | Frisch et al. |
| 5,736,008 A | 4/1998 | Barrows et al. |
| 5,737,851 A | 4/1998 | Novak et al. |
| 5,760,126 A | 6/1998 | Engle et al. |
| 5,763,048 A | 6/1998 | Takahashi |
| 5,830,937 A | 11/1998 | Shalov et al. |
| 5,853,809 A | 12/1998 | Campbell et al. |
| 5,858,160 A | 1/1999 | Piacente et al. |
| 5,874,684 A | 2/1999 | Parker et al. |
| 5,965,198 A | 10/1999 | Plusquellec et al. |
| 6,017,593 A | 1/2000 | Daly et al. |
| 6,039,798 A | 3/2000 | Aldcroft et al. |
| 6,218,001 B1 | 4/2001 | Chen et al. |
| 6,228,463 B1 | 5/2001 | Chen et al. |
| 6,291,078 B1 | 9/2001 | Chen et al. |
| 2002/0168501 A1 | 11/2002 | Sigel et al. |

OTHER PUBLICATIONS

Gallouèdec et al., "Enhancement of mechanical and optical properties of waterborne polyurethane lacquers on plastic surfaces by using ultra–fine polyamide powders. A new approach to "soft feel" coatings," *Waterborne, High–Solids, and Powder Coatings Symposium*, Feb. 14–16, 1996. New Orleans, LA.

Hoorn et al., 1995, "Metal–binding affinity of a series of ω–amino–alkylbenzimidazoles immobilized on silica," *Reactive and Functional Polymers* 27:223–235, no month avail.

Misra et al., 1998, "Hybrid inorganic–organic UV–curable abrasion–resistant coatings," *Surface Coatings International* 12:594–595, no month avail.

Gallouedec et al., "Optimizing the use of ultrafine microporous polyamide powders to obtain low–gloss UV curable coatings," *RADTECH Report*, Sep./Oct. 1995, pp. 18–24.

METHOD FOR MAKING DIFFERENTIAL GLOSS COVERINGS

BACKGROUND OF THE INVENTION

1. Field of the Invention

The present invention generally relates to a differential gloss covering and method for making the same. More specifically, the present invention relates to a radiation curable floor or surface covering with a top layer exhibiting differential gloss.

2. Description of Related Art

A distinct difference between glossy and matted areas on the top surface of a covering is desirable to provide distinctive appearances. Therefore, an important feature for many coverings is the presence of selected areas or zones on the top layer of the covering that have a distinctive visual appearance compared to the remaining areas or zones. That is, a covering having differential gloss can be provided by a covering having certain areas with high gloss and other areas of low gloss or a dull, matte finish. For example, it is desirable to effect a low gloss finish on the surface overlying a particular portion of a decorative pattern, such as an imitation of a joint or grout and a high gloss finish on the remaining surface overlying the decorative pattern imitating a tile. Several methods have been developed to provide a covering having differential gloss on its surface.

U.S. Pat. No. 4,029,831 describes a method whereby an ink composition containing a curing inhibitor and solvents is applied to a base coat. The solvents are then flashed off, and a top coat is applied. In those areas of the top coat overlying the ink curing is inhibited, which produces a diffusely reflecting surface contrasted to the areas not affected by the inhibitor, which are smooth reflecting surfaces. However, the top coat is limited to an alkyd resin coating containing a polyester product with polyhydric alcohols, polybasic acids, monobasic fatty acids, and hydrocarbon solvents, the polymerization of which is an acid catalyzed or condensation polymerization reaction. As such, the inhibitors disclosed are designed to reduce the polymerization rate for this acid catalyzed system and are explicitly limited to amino methyl-propanol (AMP), hydroxyethyl-trimethyl ammonium bicarbonate, and choline.

U.S. Pat. No. 4,169,167 describes a gradient cure scheme for a radiation curable covering to produce a low-gloss finish. The gradient cure scheme includes a ultraviolet (UV) curing step in an oxygen-containing atmosphere, which actually inhibits the free radical polymerization process, to cure only the covering except for the top layer. A second UV curing step is then performed in an inert atmosphere to completely cure the top layer. Such a gradient cure scheme is thought to cause a required flatting agent to migrate to the surface of the top layer and effect a matte finish thereon upon finally curing the top layer. However, this process does not provide for differential gloss levels across the surface of the same covering.

U.S. Pat. Nos. 4,187,131; 4,214,028; 4,217,385; 4,248,922; and 4,273,819 each describe a method for effecting different surface effects in different areas of a covering. However, each of these methods utilizes mechanical embossing to provide heat to effect polymerization in some areas of the covering to cure and, thereby, permanently set the embossed, dull matte finish in those areas.

U.S. Pat. No. 4,298,646 teaches a method for obtaining differential gloss in a thermally cured top layer by adding polymerization catalysts to an ink layer that is deposited below the top layer according to a pre-selected pattern. Areas of the top layer above the ink layer containing the polymerization catalysts are then cure to a glossy finish, while other areas not above the ink layer would remain uncured. A flatting agent containing a polymerization catalyst is then dry flocked onto the top layer where it would adhere to the uncured portions of the top layer but not to the cured areas. The top layer would then be heated to thermally cure the uncured areas now containing the flatting agent to provide a cured low gloss area, thereby providing a covering having differential gloss. However, this process requires the separate addition of a flatting agent by flocking and at least two curing steps.

Similar to U.S. Pat. Nos. 4,169,167, 4,309,452 describes a process whereby differential gloss is obtained by first curing a first layer with ionizing radiation or UV light in an oxygen containing atmosphere and then applying a second layer to selected areas of the first layer and curing the entire covering in an inert atmosphere.

U.S. Pat. No. 4,491,616 describes a method for achieving differential gloss in the wear layer of a covering by applying an ink layer containing a photoinitiator only in certain areas of a substrate. Then a radiation curable layer is applied and radiation is used to cure those areas above the photoinitiator to produce a dull, matte effect. The remaining areas are then thermally cured to provide a glossy effect, thereby providing differential gloss across the surface of the covering. In addition, the substrate may contain a foamable layer, and a blowing inhibitor may be applied in the same areas as the photo-initiator. Therefore, upon foaming and curing, the non-foamed areas will correspond to, or be in register with, the dull matte areas. However, this process requires at least two curing steps.

U.S. Pat. Nos. Re. 33,069 and Re. 33,599 describe an ink layer containing a photo-initiator deposited on top of a PVC gel layer made of a PVC plastisol containing acrylic monomers. The PVC layer is gelled in an oven and solidified at a temperature low enough to prevent polymerization of the monomers. The PVC layer is passed through an embossing roll to provide mechanical impressions and a dull finish in the soft PVC layer. The PVC layer is exposed to UV radiation that polymerizes the acrylic monomer in the areas below the ink layer having the photo-initiator that has diffused from the ink layer. This polymerization "locks in" the dull finish on the surface in the areas below the ink layer, because the PVC layer in these areas has polyermized and is set. The PVC layer is then heated again, which causes the area not below the ink to flow such that the mechanically impressed dull finish in these areas is replaced by a smooth shiny surface. However, this process also requires two curing steps and the step of mechanical embossing.

Other methods for effecting differential gloss include U.S. Pat. Nos. 4,450,194; 4,456,643; and 5,080,954 describe methods for achieving differential gloss through the use of particles in a particular layer of the covering. U.S. Pat. No. 5,165,967 describes the use of two different coatings on the top surface to effect differential gloss.

As noted, the foregoing processes have certain disadvantages. For example, some of the foregoing processes require a mechanical embossing step prior to a radiation or UV-curing step. In addition, many of such processes require two or more curing or heating steps. Furthermore, such additional mechanical embossing or thermal treatment complicates the fabrication processes and increases the manufacturing cost of the differential gloss coverings.

Based on the foregoing, there is a need for a differential gloss covering and method therefor that do not require additional heating and mechanical embossing steps. Furthermore, there is a need for manufacturing such a differential gloss covering by a process requiring fewer steps than its conventional counterparts.

SUMMARY OF THE INVENTION

The object of the present invention is to provide a differential gloss covering and method therefor. More particularly, the covering provided by the present invention includes a differential gloss top layer that registers with an underlying print and/or embossing of the covering.

Another object of the present invention is to provide a differential gloss covering by varying microscopic chemical and/or physical structures in different areas or regions of a top layer of the covering. More specifically, the present invention provides a means for manipulating the gloss of different regions of the top layer by controlling the rate of in-situ polymerization of monomers and/or oligomers of the top layer into polymers thereof.

Another object of the present invention is to provide a differential gloss covering by varying microscopic structures of chains of polymer molecules in the top layer of the covering. Different microscopic structures of the polymer chains provide differential gloss to different areas or regions of the top layer.

Another object of the present invention is to provide a differential gloss covering by varying distribution pattern or concentration profile of a flatting agent in the top layer of the covering. Different concentration profiles of the flatting agent exhibit differential gloss in different regions of the top layer.

Another object of the present invention is to provide the foregoing differential gloss coverings while maintaining at least substantially similar or uniform macroscopic structure in its top layer. More particularly, the top layer of the foregoing differential gloss covering may be manipulated to have at least substantially similar or uniform surface configuration and/or thickness.

Another object of the invention is to provide the foregoing differential gloss coverings through radiation-initiated in-situ polymerization of the monomers and/or oligomers. More particularly, the present invention accomplishes this goal without any additional thermal, mechanical or chemical treatment of the top layer. Accordingly, the present invention allows fabrication of the foregoing differential gloss covering through fewer process steps than its conventional counterparts.

Another object of the present invention is to provide the foregoing differential gloss coverings and to treat the covering with additional chemical and/or mechanical embossing process steps to enhance the differential gloss in its top layer.

Another object of the present invention is to provide an ink composition for the foregoing coverings that manipulate the gloss in different regions of the top layer disposed thereover. More specifically, the invention provides a means for controlling the gloss by incorporating various curing agents in the ink layer.

Another object of the present invention is to provide a composition for the top layer of the foregoing coverings that can generate differential gloss by the foregoing ink compositions.

The foregoing differential gloss covering comprises a backing substrate, an ink layer, and a cured top layer having a first surface portion with a first gloss and a second surface portion, made by the process comprising providing the backing substrate; depositing an ink formulation comprising a curing agent over at least a first area of a top side of the backing substrate to form said ink layer; coating the top side of the backing substrate with a radiation curable formulation to form a top curable layer; diffusing at least a portion of the curing agent into the top curable layer; curing the top curable layer to form the cured top layer and thereby forming a differential gloss covering having said first surface portion above the first area of said top of said backing substrate having the first gloss and the second surface portion having the second gloss that is different from said first gloss.

The foregoing differential gloss coverings and methods of the present invention offer numerous advantages over prior art differential gloss coverings. First, the methods of the present invention allow fabrication of the differential gloss top layer of the foregoing covering through a single treatment step, for example, a radiation curing step. Compared with conventional fabrication methods generally requiring additional mechanical or thermal treatment steps for differential gloss, the method of the present invention does not require such additional steps. With fewer process steps, the method of the present invention is simpler and more efficient than the conventional methods. In addition, contrary to the conventional coverings which require non-uniform surface structure for differential gloss effects, the covering made by the method of the present invention manifests such differential gloss on a top layer thereof having at least substantially similar or uniform macroscopic structure across its entire region. Therefore, the method of the present invention can provide higher quality coverings with differential gloss at a lower cost. Furthermore, because the foregoing method does not involve any process step requiring extraordinary operation conditions, such a method can be readily used in conjunction with other conventional process steps such as, e.g., mechanical embossing, chemical embossing, incorporation of flatting agent and/or dyes in the top layer, and the like. Thus, the differential gloss of such a covering may be easily enhanced or augmented. Moreover, because the foregoing method provides the differential gloss covering by controlling the rate of polymerization of the curable substances in the top layer, coverings with different patterns of differential gloss may be manufactured, for example, by simply varying operational parameters for the polymerization process, such as temperature, pressure, type and concentration of the curing agents, characteristics of the radiation energy source, and the like.

Numerous embodiments of differential gloss coverings and processes of making the same described heretofore and hereinafter are applicable to general-purpose residential sheet coverings. However, such coverings and processes may also be applied to provide tiles, in particular, high-end "no wax" residential tiles.

The above objects as well as other objects and features of the present invention will appear from the following description from which the preferred embodiments are set forth in detail in conjunction with the accompanying drawings.

DETAILED DESCRIPTION OF THE PREFERRED EMBODIMENTS

The following description in conjunction with the accompanying drawings provides exemplary embodiments of coverings having differential gloss and methods of making the same. In particular, methods are described making the differential gloss coverings of the present invention by employing various curing agents, such as promoters and inhibitors, for in-situ polymerization of monomers and/or oligomers in the top layer of such coverings. The reader will note that the same reference designations appear in multiple locations through the drawings. Where this is the case, the numerals refer to the same or corresponding structure in each of those locations.

As used herein, a "polymerization initiator," "polymerization promoter" or simply "promoter" refers to any suitable substance that itself, or upon activation thereof, increases the rate of polymerization of functional monomers and/or oligomers. A "photo-initiator" is one of the foregoing polymerization promoters and generally refers to any suitable substance that is decomposed or modified by radiation energy, such as UV rays, and forms free radicals or ions facilitating chain propagation for the polymerization reaction. The "photo-initiator" may also refer to any suitable substance that can be decomposed or modified by radiation energy and forms free radicals or ions that have low reactivity or selectivity to facilitate the chain propagation of the polymerization reaction.

A "polymerization inhibitor" or simply an "inhibitor" is any suitable substance that itself, or upon activation thereof, decreases the rate of polymerization of functional monomers and/or oligomers. A "photo-inhibitor" is one of the foregoing polymerization inhibitors and generally represents any suitable substance that can be decomposed or modified by radiation energy, such as UV rays, and forms free radicals or ions that combine with or consume propagation sites of monomers and/or oligomers, thereby reducing the rate of the polymerization reaction.

Figure 1:
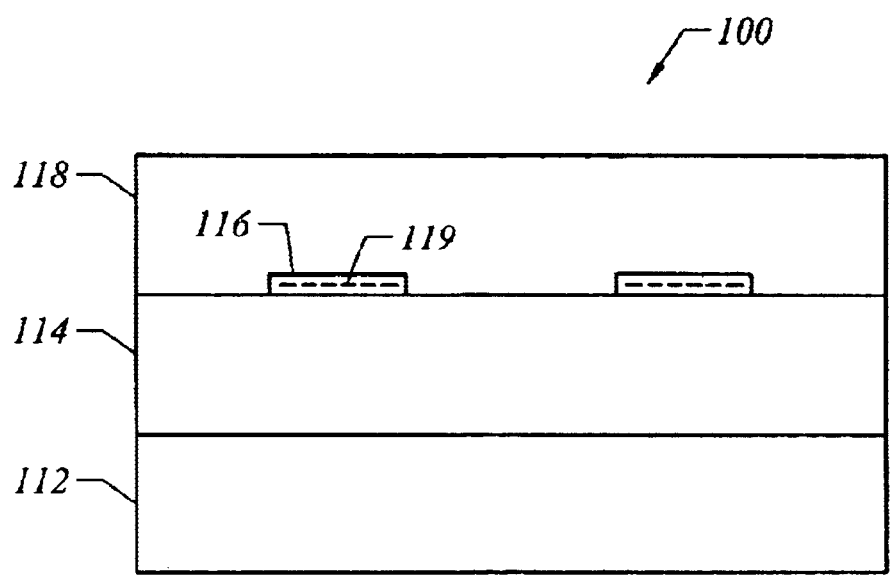
FIG. 1 is a cross-sectional schematic view of a backing substrate according to one embodiment of the present invention.

FIG. 1 is a cross-sectional schematic view of a backing substrate according to one embodiment of the present invention. The backing substrate 100 comprises multiple layers such as a backing layer 112, which may be, for example, a felt layer, a first gel layer 114, a substrate ink layer 116, and a second gel layer 118. The following discussion of the backing substrate 100 will be described in conjunction with the method by which it is made. It should be appreciated, however, that while the backing substrate 100 comprises multiple layers, a backing substrate comprising only one layer may be used in conjunction with the present invention. Moreover, it should be appreciated that while the present invention is described in connection with a particular backing substrate that is more analogous to flexible sheet flooring, the present invention is equally applicable to tile products as well. In this case, the backing substrate is different from the backing substrate described in connection with FIGS. 1–6; however, one of skill in the art will appreciate the ability to utilize the present invention with any type of backing substrate, including sheet flooring and tiles, such as high-end "no wax" residential tiles.

The backing layer 112 is provided to form the very bottom of the backing substrate 100. In general, the backing layer 112 is made of felt paper that adheres to and provides mechanical support to other layers disposed thereover. The backing layer 112 also preferably maintains integrity of the entire covering.

The first gel layer 114 is deposited on top of the backing layer 112. The first gel layer 114 preferably has a foamable polymer composition and is typically composed of resin particles dispersed in plasticizers (collectively referred to as a "plastisol"). The resin particles are typically made of or include materials that exhibit improved mechanical and/or chemical properties, such as thermal insulation, acoustic insulation, skidding resistance, water resistance, abrasion resistance, chemical resistance, indent resistance, scratch resistance, stain resistance, flexibility, rigidity, and the like. The resin particles of the first gel layer 114 are preferably made of or include monomers and/or oligomers of thermoplastic polymers, thermoset polymers, and/or vulcanized polymers. It is preferred that first gel layer 114 include or be made of monomers and/or oligomers of thermoplastic polymers, examples of which may include, but are not limited to, polyolefins, polyethylenes, polypropylenes, polystyrenes, PVCs, polyamides, polyesters, polyimides, polyurethanes, polycarbonates, acrylonitrile-butadiene-styrenes (ABS), nylons, acetal compounds, acrylic compounds, and combinations thereof. However, the first gel layer 114 is preferably made of or includes the monomers and/or oligomers of the "foamable" thermoplastic and/or thermoset polymers that can be foamed by gas released by a blowing agent, which will be described in detail below. Based on the chemical properties (for example, solubility or compatibility) of such resin particles, one or more plasticizers may be included accordingly. For preferred PVC resin particles, phthalates are used as a preferred plasticizer.

The first gel layer 114 also generally includes a blowing agent and a catalyst therefor, where the blowing agent is selected to decompose at or above a decomposition temperature and to generate gases such as nitrogen. The catalyst is arranged to facilitate generation of gases by, for example, lowering the decomposition temperature of the blowing agent. An exemplary blowing agent is azodicarbonamide, for which a zinc oxide may be used as the catalyst. It is the production of this gas that causes foaming of the first gel layer 114.

After the first gel layer 114 has been deposited on top of the backing layer 112, the first gel layer 114 is partially solidified or gelled at a pre-selected temperature that is preferably lower than the decomposition temperature of the blowing agent, for example, 300° F. After the first gel layer 114 forms a substantially solid and non-foamed surface, a water-based substrate ink layer 116 is printed on the first gel layer 114 in a pre-selected design pattern. The substrate ink layer 116 may be colored and/or pigmented and may also include an optional blowing inhibitor 119 that inhibits the decomposition of the blowing agent in first gel layer 114. A typical example of the blowing inhibitor 119 are azole compounds, such as tolyl-triazoles that affect the catalytic activity of a blowing catalyst such as ZnO. The substrate ink layer 116 may also include a carrier (such as isopropyl acetate, isopropyl alcohol, and water) and a binder (such as PVC copolymer resin and latex resin). (It should be appreciated that the substrate ink layer 116 has a different formulation from an ink layer 120 described in connection with FIGS. 3–6.)

The stack of layers 112, 114, and 116 is then wound or rolled up and aged for a pre-selected period of time (i.e., the diffusion period) so that the blowing inhibitor 119 can diffuse from the substrate ink layer 116 into the first gel layer 114. The blowing inhibitor 119 is believed to deactivate the catalyst in the first gel layer 114, thereby reducing the extent and/or rate of decomposition of the blowing agent in the first gel layer 114. The diffusion period is typically about 24 hours, although it may be selected depending on, for example, the concentration of the blowing inhibitor 119 in the substrate ink layer 116, the extent of solidification or gelation of the first gel layer 114, the diffusion coefficient of the blowing inhibitor 119 in the first gel layer 114, the thicknesses of the substrate ink layer 116 and/or the first gel layer 114, the diffusion temperature, and the like.

After the diffusion period, the stack of layers 112, 114, and 116 is unwound, and a second gel layer 118 is deposited on top of the first gel layer 114 and the substrate ink layer 116. The second gel layer 118 is also composed of liquid plastisol such as PVC and/or other resin particles that are dispersed in suitable plasticisers. The second gel layer 118 is preferably formulated to form a clear layer after solidification. The second gel layer 118 is also typically referred to as a "wear layer" because it may mainly serve to protect the underlying substrate ink layer 116 and the first gel layer 114 from wearing and from other chemical or mechanical damage. Therefore, resin particles in the second gel layer 118 may be selected from any of the foregoing polymers described for use in conjunction with the first gel layer 114 as long as such polymers meet the foregoing transparency and resiliency requirements.

Figure 2:
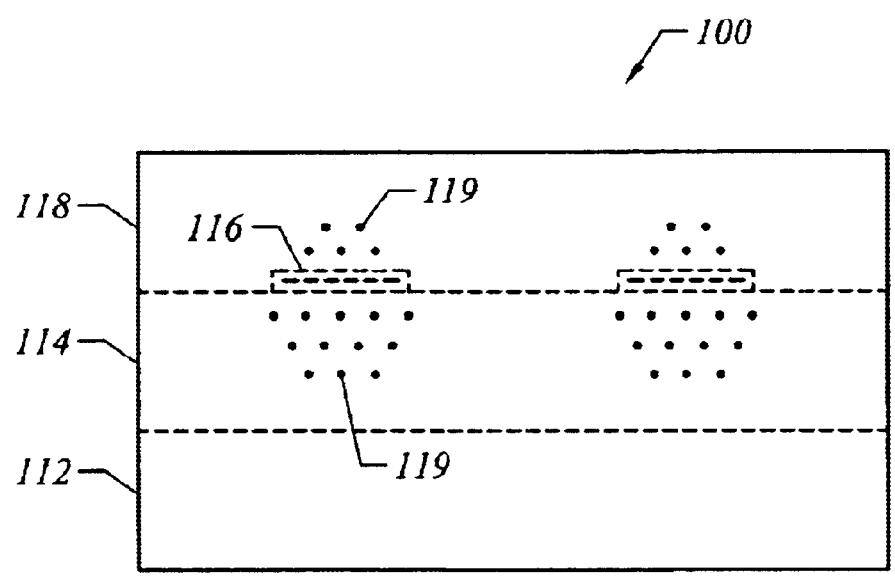
FIG. 2 is a cross-sectional schematic view of the backing substrate of FIG. 1 after being fused by thermal treatment according to the present invention.

FIG. 2 is a cross-sectional schematic view of the backing substrate of FIG. 1 after being fused by thermal treatment according to the present invention. In practice, the backing substrate 100 is thermally treated by heating at a preselected temperature (i.e., the fusion temperature) for a pre-selected period of time (i.e., the fusion period) to solidify and form a fused, unitary layer. The fusion temperature and fusion period generally depend on, for example, the thicknesses of each of the layers comprising the backing substrate 100 and the thermal properties of each of the materials in those layers, for example, the glass transition temperature and melting point. The fusion temperature typically ranges from 250–450° F., preferably from 350–400° F., and is most preferably about 385° F. The fusion period is typically several minutes, preferably from 1–3 minutes, and more preferably about 1.5 minutes.

Materials for each of foregoing layers 112, 114, and 118 are preferably selected so that the melting point and/or glass transition temperature of each is higher than the decomposition temperature of the blowing agent. Then, during fusion, the blowing agent, such as azodicarbonamide, is decomposed and causes nitrogen gas to be injected into the polymer matrix of the first gel layer 114. As a result, the first gel layer 114 increases its thickness and forms a foamed cell structure. The ratio of the thickness of the first gel layer 114 after foaming to that before foaming is generally referred to as the "blow ratio." The typical range of the blow ratio is from approximately 1.0–10, (a blow ratio of 1.0 corresponds to the embodiment incorporating no blowing agent and no blowing process), or preferably from approximately 2.0–4.0. However, when the blowing inhibitor 119 in the substrate ink layer 116 diffuses into portions of the first gel layer 114 disposed directly thereunder, the blowing inhibitor 119 deters decomposition of the blowing agent, resulting in less foaming and less of an increase in the thickness of the first gel layer 114 in those areas. Therefore, the foregoing foaming process can provide a non-uniform macroscopic structure in the backing substrate 100 such as an embossed structure produced by chemical embossing as described above. Alternatively or additionally, the backing substrate 100 may also be mechanically embossed after it is cooled to a desirable temperature by passing it through an embossing roller. As will be discussed in greater detail below, it is preferred, however, that such chemical and/or mechanical embossing of the backing substrate 100 be performed after depositing a separate ink layer on top of the backing substrate 100.

It is appreciated that the diffusion of the blowing inhibitor 119 takes place in all directions in the backing substrate 100, including into the second gel layer 118. However, because the second gel layer 118 does not generally include any blowing agent, the blowing inhibitor 119 does not cause any macroscopic structural changes in the second gel layer 118. However, when the second gel layer 118 includes a blowing agent, chemical embossing may be obtained in both the first and the second gel layers 114, 118.

Figure 3:
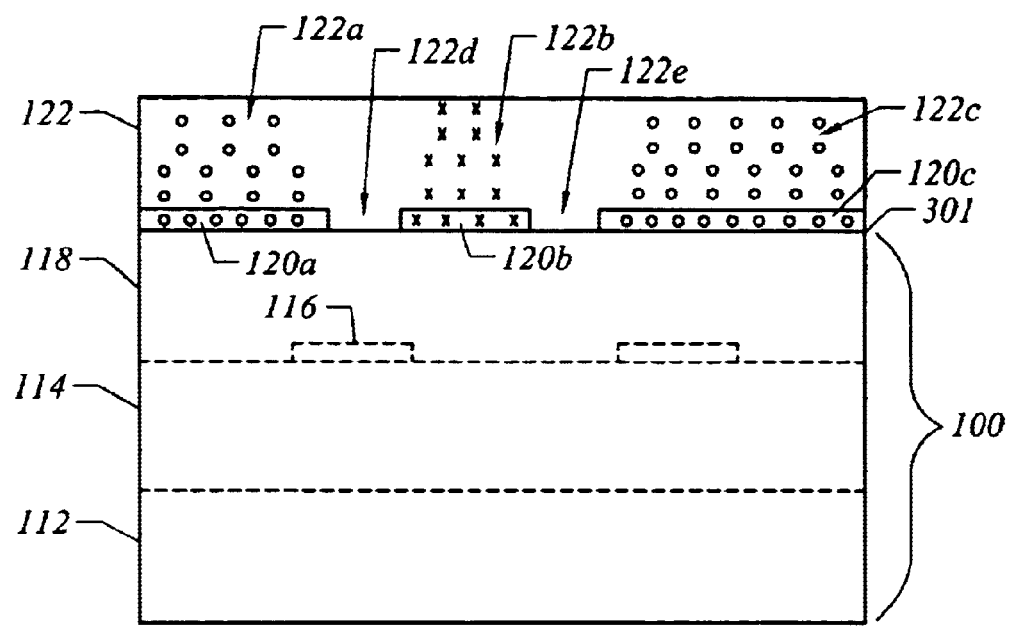
FIG. 3 is a cross-sectional schematic view of a covering including the backing substrate of FIGS. 1 and 2 according to one embodiment of the present invention.

FIG. 3 is a cross-sectional schematic view of a covering including the backing substrate of FIGS. 1 and 2 according to one embodiment of the present invention. In this embodiment, an ink layer 120 and a top curable layer 122 are deposited on top of the backing substrate 100 to form the covering 300. For ease of illustration, macroscopic structure of substrate layer 100 will be simplified and shown as having a substantially uniform thickness, noting that if the backing substrate 100 were subjected to either chemical embossing or mechanical embossing, its macroscopic structure would not be uniform. It is noted, however, that unless otherwise specified, the following process steps may be equally applied to other backing substrates, including those having non-uniform macroscopic structures formed through the chemical or mechanical embossing steps.

The covering 300 is constructed by first cleaning the fused, top surface 301 of the backing substrate 100 (i.e., the exposed surface of the second gel layer 118) with an acid solution (such as diluted acetic acid) to remove dirt and oil therefrom. An ink formulation is then deposited on preselected portions of substrate layer 100 to form ink layers 120a–120c by coating or printing the ink formulation thereover according to a pre-selected pattern. The ink formulation may be either water-based or solvent-based and further mixed with a carrier (e.g., isopropyl acetate) and a binder (e.g., PVC copolymer binder resin such as VAGF available from Union Carbide, Danbury, Conn.). As will be described in greater detail below, the ink formulation of the ink layer 120a–120c includes one or more curing agents. (Thus, as noted above, the ink layer 120a–120c is different from the substrate ink layer 116 described in connection with FIGS. 1 and 2, which does not contain any curing agent.)

For proper deposition of the ink formulation on backing substrate 100, it is preferred that the top surface 301 of backing substrate 100 be fairly smooth. Therefore, any mechanical or chemical embossing of backing substrate 100 is preferably performed after the deposition of the ink layer 120a–120c. It should be appreciated that any ink deposition methods may be used to deposit the ink layer 120a–120c, though gravure printing is preferred.

The ink formulation also includes one or more curing agents that are capable of regulating the rate of in-situ polymerization of the monomers and/or oligomers of the top curable layer 122, which will be discussed in greater detail below. Such a curing agent may be a polymerization promoter, which accelerates the rate of polymerization of the monomers and/or oligomers, or a polymerization inhibitor, which inhibits the rate of polymerization of the monomers and/or oligomers. It should be appreciated, however, that such curing agents while preferably contained within the ink formulation may also be applied separate from the ink formulation.

The curing agent is preferably a radiation-activated promoter. For example, the promoter may be a photo-initiator that can be activated by radiation energy, e.g., UV rays, which results in an increase in the rate of the polymerization of the monomers and oligomers. Examples of such photo-initiators include, but are not limited to, 2-hydroxy-2-methyl-1-phenyl-propan-1-one (DAROCURE 1173™ available from Ciba-Geigy Corp., Hawthorne, N.Y.); 2,4,6-trimethyl-benzoyl-diphenyl-phosphine-oxide (LUCIRN TPO™ available from BASF, Charlotte, N.C.); 1-hydroxy-cyclohexyl-phenyl-ketone (IRGACURE 184™ available from Ciba-Geigy Corp.); 2,2-dimethoxy-2-phenyl-acetophenone (IRGACURE 651™ available from Ciba-Geigy Corp.); 2-methyl-1-[4-(methylthio)phenyl]-2-morpholino-propanone-1 (IRGACURE 907™ available from Ciba-Geigy Corp.); ethyl-2,4,6-trimethyl-benzoyl-phenyl-phosphinate (LUCIRIN TPO-L™ available from BASF); a 50:50 blend of DAROCURE 1173™ and 2,4,6-trimethyl-benzoyl-diphenyl-phosphine-oxide (DAROCURE 4265™ available from Ciba-Geigy Corp.); a 50:50 blend of DAROCURE 1173 and LUCIRIN TPO™; or a 50:50 blend of 1-hydroxy-cyclohexyl-phenyl-ketone and benzophenone (IRGACURE 500™ available from Ciba-Geigy Corp.).

The curing agent may also be a radiation-activated photo-inhibitor that is activated by radiation energy, e.g., UV rays, which decreases the rate of the polymerization of the monomers and/or oligomers. Examples of photo-inhibitors include, but are not limited to, 2-phenoxyethyl-acrylate (SR 339™ available from Sartomer, Exton, Pa.); ethoxylated-diphenol-A-dimethacrylate (SR 348™ available from Sartomer); methyl-hydroquinone (M-HQ™ available from Aldrich, Milwaukee, Wis.); 4-methoxy-phenol (4-MP™ available from Aldrich); or butylated-hydroxy-toluene (BHF™ available from Aldrich).

The ink layers 120a–120c are then dried at a pre-selected temperature for a pre-determined period of time. Preferably, the pre-selected temperature is approximately between room temperature and 70° C., and the pre-determined period of time is approximately between 1–300 seconds. Additional chemical and/or mechanical embossing may be applied thereafter. It is noted that the drying process may continue until the dynamic and/or kinematic viscosity of the ink layers 120a–120c and/or concentration of the curing agents in the ink layers 120a–120c increases to a pre-selected value, which is determined based upon the degree of tackiness. Preferably, the degree of tackiness is minimized.

The top curable layer 122 is coated onto the backing substrate 100 (i.e., on top of second gel layer or wear layer 118) and, therefore, over the ink layers 120a–120c using a roller. The top curable layer 122 includes portions 122a–122c, which are disposed over the ink layers 120a–120c, and other portions 120d, 120e disposed over the backing substrate 100 but not over the ink layers 120a–120c. Excess curable materials are immediately removed by an air knife from the top curable layer 122 and recycled back into a trough (not shown).

The top curable layer 122 is generally composed of functional monomers and/or oligomers or a resin formulation that are preferably radiation curable and that can be polymerized in-situ in the top curable layer 122. These curable compositions may be monomers and/or oligomers of the foregoing polymers used to fabricate the backing substrate 100 so that the covering 300 exhibits the foregoing improved properties on both of its top and bottom surfaces. Typical examples of such monomers and oligomers include, but are not limited to, mono-, di-, tri-, and tetra-, and/or penta-functional acrylates; urethane acrylates; polyester acrylates; epoxy acrylates; melamine acrylates; mono-, di-, tri-, tetra, and penta-functional methacrylates; mixtures thereof, and the like. Crosslinkable monomers and/or oligomers may also be used, e.g., divinyl-benzenes; divinyl-toluenes; ethylene glycol dimethacrylates and/or diacrylates; diethylene glycol diacrylates and/or dimethacrylates; triethylene glycol dimethacrylates and/or diacrylates; tetraethylene glycol diacrylates and/or dimethacrylates; polyethylene glycol dimethacrylates and/or diacrylates; 1,3-butylene-glycol dimethacrylates; 1,3-butylene-glycol diacrylates; 1,4-butylene-glycol diacrylates; 1,4-butylene-glycol dimethacrylates; 1,6-hexanediol dimethacrylates; 1,6-hexanediol diacrylates; neopentyl-glycol diacrylates; neopentyl-glycol dimethacrylates; bisphenol-A-dimethacrylates; ethoxylated-bisphenol-A-dimethacrylates; trimethylol-propane-trimethacrylates; trimethylol-propane-triacrylates; pentaerythritol-triacrylates; glyceryl-trimethacrylates; pentaerythritol-tetracrylates; pentaerythritol-tetramethacrylates; mixtures thereof, and the like. In general, any compounds that can be decomposed and generate at least one propagation site may be employed as the functional monomers and/or oligomers. When the top curable layer 122 requires additional aesthetic, mechanical, and/or chemical requirements after the top curable layer 122 is cured, as described below, other suitable monomers and/or oligomers may also be used to satisfy such requirements.

After physically depositing the top curable layer 122 over the backing substrate 100 and thereby also over the ink layers 120a–120c, the curing agents in the ink layers 120a–120c gradually diffuse into portions 122a–122c of top curable layer 122 by then maintaining contact between these layers at a pre-determined temperature for a pre-selected period of time. Preferably, the pre-determined temperature is approximately between room temperature and 70° C., and the pre-selected period of time is approximately between 1–300 seconds. As will be discussed in greater detail below, the diffused curing agents are directly responsible for creating the differential gloss effect of the covering 300. Thus, the amount of the curing agents diffused into the top curable layer 122 and/or concentration profile thereof (e.g., vertical as well as horizontal concentration gradient of the curing agents within the top curable layer 122) is preferably manipulated by controlling, e.g., the diffusion temperature, the diffusion duration, the concentration of the curing agents in the dried ink layers 120a–120c, and the like. The drying temperature and/or the drying period for the ink layers 120a–120c may also be controlled to satisfy diffusion requirements of the curing agents from the ink layers 120a–120c into the top curable layer 122, for example, an amount of the curing agents to be diffused into the top curable layer 122, the concentration profile or gradient of the curing agents within the top curable layer 122, and the like. It is appreciated that the foregoing diffusion does not take place in those regions 122d, 122e that do not contact any of the ink layers 120a–120c. Therefore, after diffusion of the curing agents into the top curable layer 122, different portions 122a–122c of the top curable layer 122 have different concentrations and concentration profiles of the curing agent.

Figure 4:
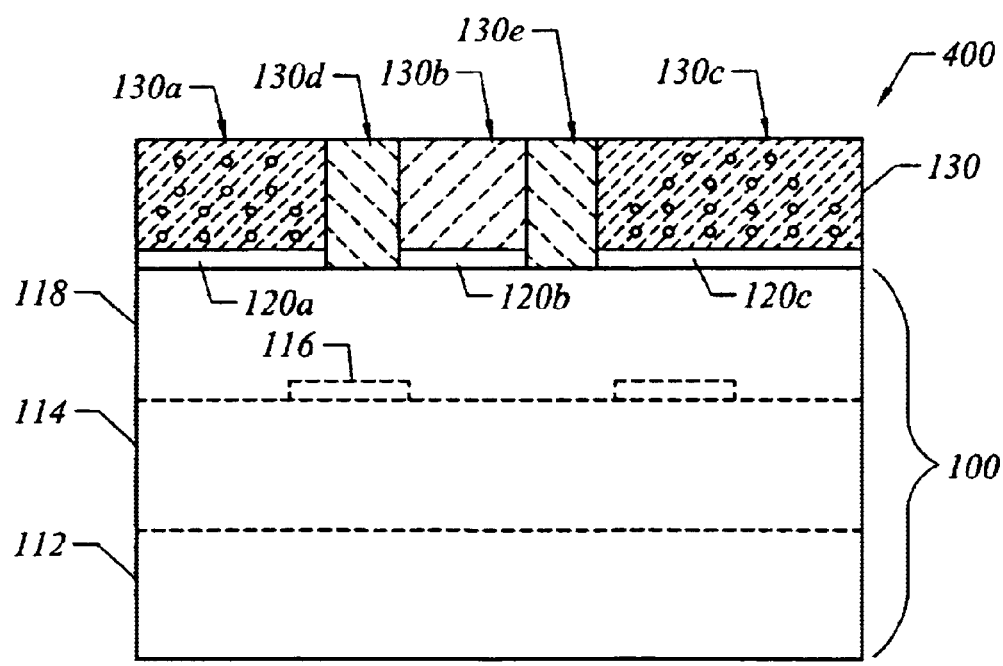
FIG. 4 is a cross-sectional schematic view of the completed covering of FIG. 3 according to one embodiment of the present invention.

FIG. 4 is a cross-sectional schematic view of the completed covering of FIG. 3 according to one embodiment of the present invention. Upon completion of the diffusion of the curing agents as described above, radiation, such as UV rays, is directed to the top curable layer 122. Radiation energy of the UV rays activates the radiation curable monomers and/or oligomers in top curable layer 122 and generates propagation sites for their polymerization, thereby initiating polymerization in-situ. When the curing agent is a polymerization promoter such as a free radical photo-initiator, UV rays decompose the photo-initiator in portions 122a–122c and generate free radicals and/or ions facilitating chain propagation of the monomers and/or oligomers for the in-situ polymerization, thereby increasing the rate of polymerization. To the contrary, when the curing agent is a polymerization inhibitor, such as a free-radical photo-inhibitor, UV rays decompose the photo-inhibitor into free-radicals and/or ions that combine with and consume the propagation sites of the monomers and oligomers, thereby degrading the chain propagation process and decreasing the rate of the polymerization reaction. As described above, the photo-inhibitor may also be decomposed or modified by radiation energy and form free radicals or ions having low reactivity or selectivity to facilitate the chain propagation of the polymerization reaction. The portions 122d, 122e that do not overlay the ink layers 120a–120c, however, contain no or at most a minimal amount of the curing agent diffused thereinto from the ink layers 120a–120c. Therefore, these portions 122d, 122e undergo the radiation-initiated in-situ polymerization without being affected by the curing agent. As a result of this radiation curing, the top curable layer 120 will be cured, and the gloss of the surface of the covering 400 for those regions affected by the curing agent will be different from the gloss of the remaining surface areas that were not affected by the curing agent. In other words, the cured top layer will have one portion of its surface with a desired gloss and a second portion of its surface with a different desired gloss.

It is noted that clear demarcation lines between different regions 130a–130e of the top polymer layer 130 are drawn for illustration purposes only and may not be realized in reality. As discussed above, the curing agent can diffuse in all directions. However, the diffusion of the curing agent into the backing substrate 100 is at most negligible due to a low diffusion coefficient of the fused top surface of the backing substrate 100. Even though some curing agents may diffuse into the backing substrate 100, they do not affect polymerization of the curable substances in the top curable layer 122 and do not alter the resulting differential gloss in different regions of the coverings. Rather, the curing agent predominantly diffuses into the top curable layer 122. Although the majority of the curing agent molecules would diffuse vertically into the top curable layer 122, some would also diffuse laterally, resulting in blurred demarcation zones. In general, the extent of such lateral diffusion depends on, for example, the diffusion characteristics of the top curable layer 122 in both the vertical and lateral directions, the diffusion temperature and period, and the like.

It is also noted that the above accelerated or decelerated polymerization reactions take place while the top curable layer 122 is treated by a gradient curing scheme that typically allows polymerization in the presence of oxygen (e.g., air) followed by polymerization in an inert or oxygen-free atmosphere (e.g., nitrogen). Details of such gradient curing scheme and resulting differential gloss and microwrinkles are described in U.S. Pat. No. 5,585,415, which is incorporated herein in its entirety by reference. Therefore, the monomers and/or oligomers in the different portions 122a–122e of the top curable layer 122 can be polymerized at different rates and converted into different regions 130a–130e of the top polymer layer 130, respectively.

It is further noted that the top polymer layer of the completed differential gloss covering of the present invention may be manipulated to maintain identical or at least substantially similar macroscopic structure. For example, an entire portion or at least a substantial portion of the top polymer layer may be arranged to have identical or at least substantially similar thickness, texture, roughness, presence or absence of mechanical embossing, and/or other surface configurations. As discussed above, this description, for illustrative purposes, is directed to a generally flat backing substrate having a uniform thickness. When the backing substrate has non-flat configuration (for example, non-uniform thickness or height, chemical or mechanical embossing, etc.), the ink and top polymer layers deposited thereon may be deposited to have uniform, pre-selected thicknesses and arranged to conform to the contour of the backing substrate. Although the top polymer layer of such an embodiment has to have a curved configuration, it may still be made to maintain identical or at least substantially similar macroscopic structure such as thickness, texture, roughness, and/or other surface configurations. Alternatively, ink layers may be coated on the backing substrate and curable substances may be provided to fill gap spaces between ridges of the backing substrate. By forming a top curable layer having a flat top surface and by curing the curable substances, a resulting top polymer layer may be arranged to have a flat top surface and to manifest differential gloss in different regions thereof.

Figure 5:
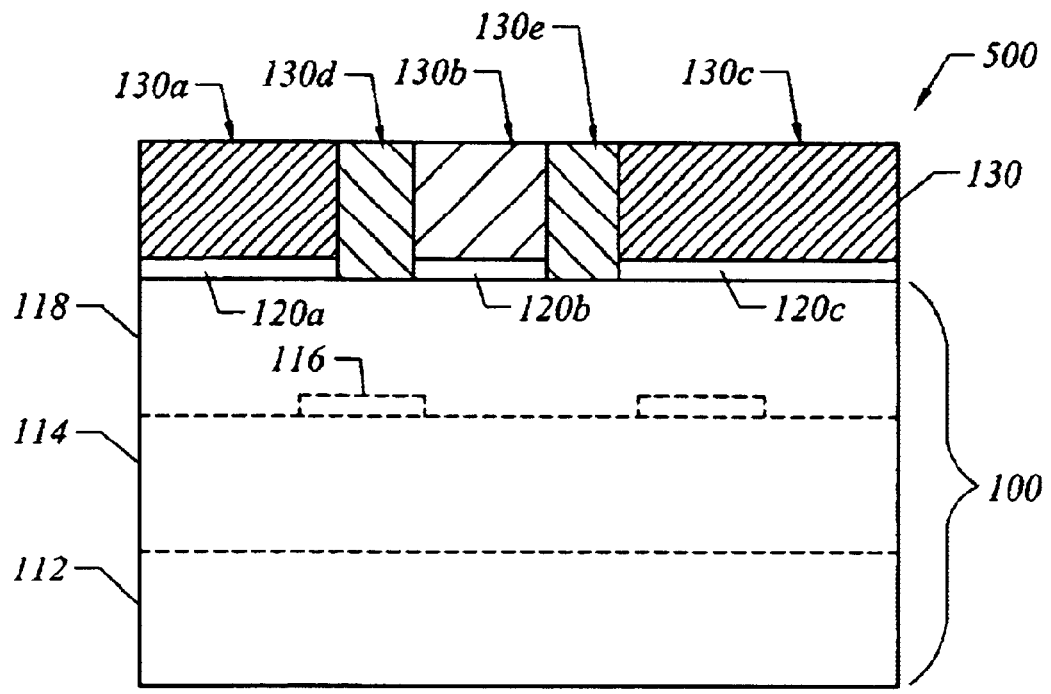
FIG. 5 is a cross-sectional schematic view of an exemplary differential gloss covering according to the present invention.

FIG. 5 is a cross-sectional schematic view of an exemplary differential gloss covering according to the present invention. In general, polymers formed at different rates of polymerization in the different regions 130a–130e of the top polymer layer 130 have different microscopic structures, for example, different polymer chain configurations as well as different chemical, mechanical or optical properties resulting therefrom. Such polymer chains may have, for example, different lengths (i.e., molecular weights), different two-dimensional and/or three-dimensional chain orientations, different tortuosities, different aspect ratios, different extent of cross-linking among the chains, different densities, and the like. Unless the foregoing polymer chains are perfectly isotropic, the chains of the polymer molecules formed at different polymerization rates would manifest different optical properties, for example, reflectivity, refractivity, and transmittance. Thus, it is believed that differential gloss provided to the top polymer layer of the covering is at least partially attributed to the different microscopic structures of the chains of the polymer molecules included therein.

As will be discussed in the following Examples, the polymer molecules formed in the presence of a promoter (for example, those in the regions 130a and 130c of the top polymer layer 130 disposed over ink regions 120a and 120c, respectively) are found to have a microscopic polymer chain structure that exhibits a higher gloss than the polymer molecules not influenced by such promoters (for example, those in the regions 130d, 130e of top polymer layer 130 that are disposed over the backing substrate 100 but not over the ink layer 120a, 120c). Conversely, the polymer molecules formed under the influence of an inhibitor (for example, those in the regions 130b of the top polymer layer 130 disposed over the ink layer 120*b*) show a lower gloss than those in the regions 130*d*, 130*e*.

Accordingly, the foregoing method of the present invention provides a covering with top polymer layer 130 having regions of two different glosses (e.g., high and low, high and medium, or medium and low) and/or three different glosses (e.g., high, medium, and low), each differential gloss region disposed side by side. Similarly, the foregoing method of the present invention may be readily modified to provide a covering with more than three different gloss levels by employing, e.g., multiple promoters and/or inhibitors, each differentially responding to UV rays with the same or different wavelengths. It is noted that the foregoing method of the present invention enables fabrication of a differential gloss covering with a top polymer layer that has substantially similar or uniform macroscopic structure (i.e., without any chemical or mechanical embossing provided thereon) such that the top polymer layer has, e.g., a substantially similar and/or uniform thickness, and/or substantially similar surface configuration.

It is appreciated that the foregoing layers of differential gloss covering may include at least a trace amount of foreign materials that are not initially included therein. For example, first and second gel layers 114, 118 may include a blowing inhibitor that has been diffused thereinto from the substrate ink layer 116 and has not entirely been consumed during the fusing or chemical embossing step. Similarly, various regions of the top polymer layer 130 may include at least a trace amount of promoters and/or inhibitors that have been diffused from the ink layers 120*a*–120*c* but have not been decomposed during the radiation curing step. The top polymer layer 130 may also include at least a trace amount of unreacted monomers and/or oligomers which have not incorporated into the polymer chains.

As discussed above, the method of the present invention is distinguished from the conventional methods in that the present method allows at least substantial or complete polymerization of the curable substances in the top curable layer and complete formation of the differential gloss top polymer layer solely by a single radiation curing step. Therefore, the method of the present invention does not require additional thermal treatment, chemical embossing, and/or mechanical embossing steps for providing the differential gloss. However, these additional steps may also be incorporated into the fabrication method of the present invention in order to, for example, enhance or augment the differential gloss of the covering.

Diffusion of the curing agents into the top curable layer is preferentially driven by its concentration gradient between the ink and top curable layers. Unless the top curable layer and ink layers are brought into an equilibrium (which would require an infinitely long diffusion step by definition), it would be generally impossible to prevent a concentration gradient (or concentration profile) of the curing agents from developing in the top curable layer in a vertical direction thereacross. In one aspect, such a gradient is unfavorable to the formation of a differential gloss covering when less than optimal amount of the curing agents can only be diffused into a upper portion of a high or low gloss region of the top curable layer. On the other hand, however, such a concentration gradient may be utilized to provide multiple horizontal layers of polymer molecules having different chain configurations and, therefore, differential gloss within each of the differential gloss regions 130*a*–130*c* of the top polymer layer 130. For example, within such the regions 122*a*–122*c* of the top curable layer 122 disposed on top of the ink layers 120*a*–120*c* including the photo-initiator, the lower horizontal layers include more curing agents than the upper horizontal layers thereof. Thus, the monomers and/or oligomers in the lower horizontal layers are more rapidly polymerized than the upper horizontal layers during the radiation curing step. Therefore, such differential gloss coverings can have gloss levels changing horizontally (i.e., differential gloss regions 130*a*–130*c* of the top polymer layer 130) as well as vertically (i.e., differential gloss layers in each of the foregoing regions 130*a*–130*c*). In addition, because of the foregoing vertical profile of differential gloss, such a covering may provide differential gloss varying according to the angle of view in each region of top polymer layer 130. The reverse also holds for the regions of the top curable layer disposed on top of the ink layer including the photo-inhibitor.

It is appreciated that the ink regions 120*a*–120*c* of the ink layer 120 may include the identical curing agent in different concentrations and/or multiple curing agents in the same or different concentrations. After the diffusion process, this arrangement allows different amounts or kinds of the curing agents to be diffused into the top curable layer. Accordingly, such an arrangement can augment the differential gloss in the horizontal direction.

Other variations of the present invention are also possible. For example, the substrate layer may be comprised of a single layer without any blowing agent. The substrate layer may also include more layers than the ones shown in FIGS. 1–4. Ink layers may also be deposited at different thickness and/or elevations to provide the differential gloss covering as well. Further, ink layers may only be deposited in certain areas of the layer upon which they are deposited according to a pre-selected pattern.

In addition, the differential gloss covering of the present invention and fabrication method thereof may include one or more flatting agents in the top curable layer to effect and exhibit more pronounced differential gloss. Typical examples of the flatting agents may include, but are not limited to, silica, nylon, polypropylene, polyethylene, polytetrafluoroethylene (PTFE), and other minerals or polymers having equivalent or similar optical properties.

Figure 6:
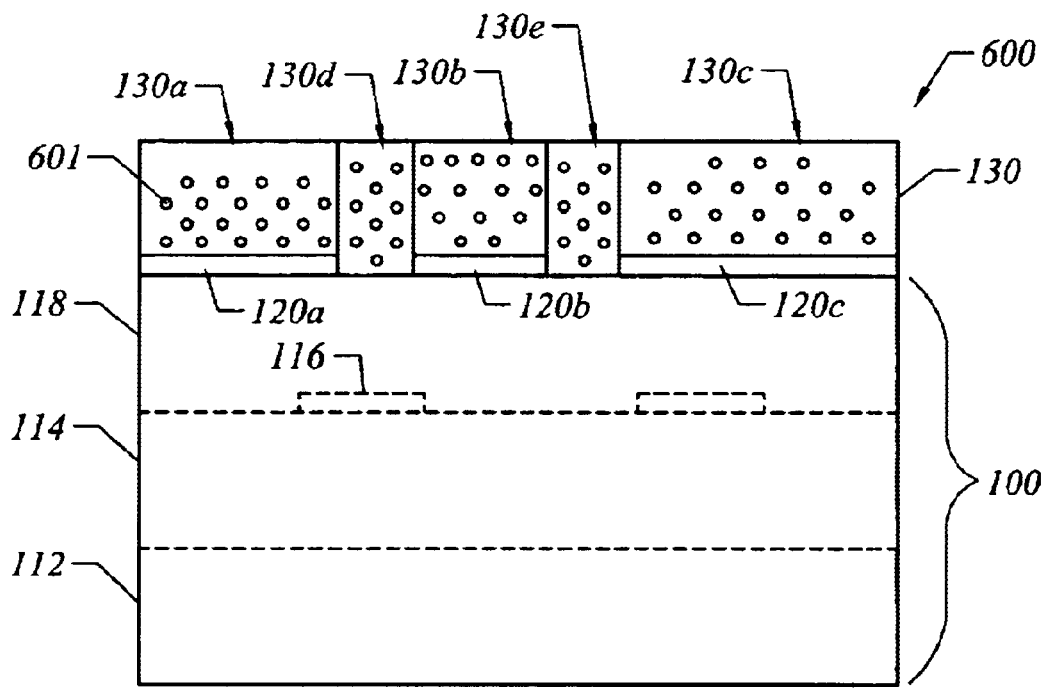
FIG. 6 shows a cross-sectional schematic view of another exemplary differential gloss covering according to the present invention.

FIG. 6 shows a cross-sectional schematic view of another exemplary differential gloss covering according to the present invention. In this embodiment, flatting agents 601, which when present at the surface of a covering tend to provide a dull, or low gloss affect, are included in a top polymer layer 130 of the differential gloss covering 600. As will be discussed in the following Examples, the curing agents tend to provide non-uniform distribution pattern of the flatting agents 601 in the top curable layer 130, create concentration gradients or profiles thereof, and differentiate gloss levels of selected regions of top polymer layer 130 from the rest thereof. For example, if curing agents such as the photo-initiators were present in the ink layers, 120*a*, 120*c*, the rate of polymerization of the monomers and oligomers in the top curable layer 130 would increase and tend to preferentially distribute the flatting agents 601 more toward ink layers 120*a*, 120*c* than at the top of top polymer layer 130, thereby providing high gloss to such regions 130*a*, 130*c* of the top polymer layer 130 overlaying these ink layers 120*a*, 120*c*. To the contrary, if the curing agents such as the photo-inhibitors were present in the ink layer 120*b* the rate of polymerization of the monomers and oligomers of the top polymer layer 130 would decrease and tend to distribute the flatting agents 601 preferentially toward the top surface of the region 130*b* of top polymer layer 130 overlaying the ink layer 120*b*, thereby providing low gloss to the region 130*b* of top polymer layer 130. The portions 130*d*, 130*e* of top curable layer 130 that are not disposed on top of ink layers 120a–120c are not affected by the curing agents, tend to have a more uniform distribution of the flatting agent 601, and provide medium gloss. Therefore, non-uniform distribution of the flatting agent 601 can enhance the differential gloss of covering 600 in different regions of its top polymer layer 130. By manipulating the distribution of the flatting agents as well as the microscopic chain structure of the polymer molecules in the top polymer layer selectively or in combination, the differential gloss of the top polymer layer can be readily customized.

Configuration of each layer of the differential gloss covering depends on various factors, which are in turn determined by chemical and physical characteristics thereof, desirable differential gloss in different regions of the top polymer layer, optical, chemical, and/or physical properties of flatting agent, and the like. Depending upon the foregoing requirements, the differential gloss covering can be provided in almost any size and/or thickness. Table 1 provides an exemplary layer configuration of a typical multiple gloss covering.

TABLE 1

Exemplary Layer Thickness of a Typical Multiple Gloss Covering

| Layer | Thickness (mil: 1 mil = 0.001 inch) |
|---|---|
| Felt Layer | 23.5–32 |
| First Gel Layer | 17–57 |
| Substrate Ink Layer | <0.5 |
| Second Gel Layer (Wear layer) | 10–20 |
| Ink Layer | <1 |
| Top Polymer Layer | 1–1.3 |

The ink layers may be coated on top of the substrate layer by employing any conventional printing techniques. For example, when the covering is to have a brick pattern and the ink layers include the photo-inhibitors, the fused wear layer would most likely have grout lines which are deeply chemically embossed as discussed above. Because the ink layers with the photo-inhibitors result in the regions of the top polymer layer with low gloss, and because such low gloss regions are often in recessed areas on the top curable layer such as grout lines, suitable conventional printing processes may preferably be applied to allow proper deposition of the ink composition in such recessed areas. When the recessed area is significantly deep and conventional gravure printing technique may not reach the bottom of the recessed area, an ink jet technique may be employed to deposit the ink formulation. Furthermore, the ink composition containing the curing agents may be pre-printed on a film and such film may be disposed between the substrate layer and top curable layer (see, for example, Example 3).

As noted above, the present invention is equally applicable to tiles, such as high-end "no wax" tiles. In the construction of an exemplary tile, PVC resin, plasticizers, pigments, and limestone filler such as calcium carbonate (preferably in a high concentration, for example, about 80%) is mixed at a pre-selected temperature, for example, ranging from 115–135° F. The mixed powder effluent is transferred to a continuous mixer held at 320–340° F. where thermoplastic limestone-filled resin is fused (i.e., entangling polymer chains) to provide tiles of various sizes. The tiles are passed through to a calendering roll, where the limestone-filled resin is partially softened and/or re-fused to form a continuous sheet of a substrate base layer having a thickness ranging from 116–118 mils at an exit temperature ranging from 250–270° F.

A substrate ink layer is then provided by printing a suitable ink formulation on a PVC film having a thickness of about 2 mil or on a transfer paper having a thickness of about 0.5 mil in a pre-selected design pattern. Thereafter, the substrate ink layer is laminated onto the substrate base layer in a nip station. When the ink formulation is printed on the transfer paper, the lamination process transfers the ink formulation from the transfer paper to the substrate base layer. The transfer paper is then immediately removed in a subsequent re-wind step. It should be appreciated that this substrate ink layer may provide a design; however, where an ink film is provided according to the present invention on top of the cap film as described below, then this substrate ink layer becomes optional, particularly where the ink film on top of the cap film provides a decorative pattern or design.

The continuous sheet of the substrate ink layer and substrate base layer is then conveyed to another nip station and a cap film (i.e., a wear layer) is laminated thereto. The cap film may be a PVC film of about 3 mil in thickness and designed to protect the underlying substrate layers from mechanical wearing and/or from other damage. Compared with the foregoing thermal lamination of the substrate ink layer, this lamination process is mainly a pressure lamination utilizing nip pressure and high temperature of the incoming substrate ink and base layers. Accordingly, the laminating rolls themselves are not separately heated.

In general, the PVC cap film forms the uppermost layer for a tile that would require periodic waxing. For a "no-wax" tile, however, a top coat layer is applied over the cap film to provide desirable durability and, therefore, to obviate the need for a sacrificial wax layer. The top coat layer is generally made of thermosetting polymers. Regardless of their end use as a waxed or no-wax tile, the continuous sheet of the cap film, substrate ink layer, and substrate base layer are optionally embossed mechanically. The resulting sheet is punched into tiles having various dimensions ranging from 6–24", for example, 12" by 12" or 14" by 14" tiles, using a metal die. Edges punched out of the continuous sheet are recycled back into the mixing process for the substrate base layer. Typically the cap film itself will have an ink film according to the present invention previously applied to its top surface, preferably by gravure printing. Optionally, it may also have a design printed on its bottom surface.

The no-wax tiles, however, are conveyed to a next station for applying a top curable layer thereon. An approximately 1–3 mil-thick layer of a top curable layer is then coated on the individual tiles comprising the ink/PVC/limestone layers using an air knife, a curtain coater, or roll coater. The tile is then cured in the curing chamber in air while illuminated first by two halogen bulbs at approximately 300 W/in$^2$ and then in an oxygen-free environment (e.g., nitrogen) at various speeds and passes. It should be appreciated this ink film may include both design elements (e.g., pigments) and photo-initiators or photo-inhibitors. In the case where the substrate ink layer discussed above provides a design, then the ink film here may only include photo-initiators or photo-inhibitors. It should also be appreciated that where the ink film does have a design element, the top curable layer is what protects the design from wear.

The tile is then annealed at 110–125° F. for up to two days to remove processing stresses and to ensure dimensional stability. Edges are ground to provide smoothness for proper field installation. A thermosetting urethane back coat layer may be applied with a roll coater to balance the curling stress imparted on the tile by the top polymer layer or top curable layer.

As such, the configuration of the layers of a tile according to the present invention generally comprises, from the bottom to top, a back coat, preferably a UV curable backcoating, having a thickness of approximately 0.5–3 mils; a substrate base layer having a thickness of approximately 50–160 mils; an optional substrate ink layer having a thickness of approximately less than 0.1–2 mils; a cap film having a thickness of approximately 2–5 mils; a substrate ink layer according to the present invention that may or may not have a design having a thickness of approximately 0.1–2 mils; and a top curable layer or top polymer layer having a thickness of approximately 1–3 mils. The configuration of the layers of a preferred tile comprises, from the bottom to top, a back coat, preferably polyurethane, having a thickness of approximately 0.5–2 mils; a substrate base layer having a thickness of approximately 50–160 mils; a substrate ink layer having a thickness of approximately less than 0.5 or 2 mils; a cap film having a thickness of approximately 2–5 mils; and a top curable layer or top polymer layer having a thickness of approximately 1–3 mils.

It should be appreciated that in any of the foregoing embodiments, the top coat or top curable layer may also include a macroscopic texture. Methods for imparting such macroscopic texture are described in U.S. patent application Ser. Nos. 09/489,420 and 09/765,713, which are hereby incorporated in their entirety by reference.

Examples 1–3 illustrate various embodiments of the differential gloss coverings and detailed processes of making the same according to the present invention. It is appreciated that the following processes of Examples 1–3 are applicable to general-purpose residential vinyl-type sheet coverings and that the process of Example 3 is preferably applied to high-end "no wax" residential tiles. However, it should be appreciated that these Examples are illustrative only and should not be viewed as limiting the scope of the present invention.

EXAMPLE 1

This example demonstrates the use of various photo-initiators to provide differential gloss coverings and compares their effects on gloss differentials of the coverings. A substrate layer of common sheet vinyl was formed from PVC plastisol as discussed above (see FIGS. 1 and 2 and refer to relevant text). An ink formulation was prepared by dissolving 15% polyvinyl-chloride copolymer binder (VAGF, Union Carbide) in isopropyl acetate and by adding curing agents such as the photo-initiators listed in Table 2 there in various concentrations ranging from 20% to 70%. In general, liquid agents were simply mixed into the ink solution at room temperature, while the solid agents were dissolved thereinto at 70° C.

TABLE 2

Photo-initiators

| Trade name | Manufactuer | Chemical Name | Physical State at 23° C. |
|---|---|---|---|
| DAROCURE 1173 | Ciba | 2-hydroxy-2-methyl-1-phenyl-propan-1-one | liquid |
| DAROCURE 4265 | Ciba | 50/50 1173/TPO | liquid |
| IRGACURE 184 | Ciba | 1-hydroxycycohexylphenyl ketone | solid |
| IRGACURE 500 | Ciba | 50/50 1-hydroxycycohexylphenyl ketone/benzophenone | liquid |
| IRGACURE 651 | Ciba | 2, 2-dimethoxy-2-phenylacetophenone | solid |
| IRGACURE 907 | Ciba | 2-methyl-1-[4-(methylthio)phenyl]-2-morpholinopropanone-1 | solid |
| LUCIRIN TPO | BASF | 2,4,6-trimethylbenzoyl diphenylphosphine oxide | solid |
| LUCIRIN TPO-L | BASF | ethyl 2,4,6-trimethylbenzoyl phenyl phosphinate | liquid |

The ink formulation was then deposited on top of the substrate layer to form ink layers. The ink layers were generally provided in a brick pattern, for example, by gravure-printing the ink formulation in brick shaped landings of the brick pattern but not in the areas formed between such landings (i.e., grout lines). The ink layers were then dried in air for at least one hour.

Various flooring samples were prepared by depositing curable substances of Table 3 on top of the ink and/or substrate layers and by forming various top curable layers (referred to as "coating") at a thickness of about 1.5 mil (1 mil=one thousands of an inch) with an air knife. The flooring samples were placed inside a curing chamber filled with air and including two mercury lamps. While being irradiated by the lamps at a setting of 300 watts/in$^2$, the flooring samples were passed twice through the curing chamber at various speeds, for example, in the range of 60 feet per minute (fpm) to 100 fpm. Air was removed from the curing chamber and nitrogen (including less than 100 ppm of oxygen) was introduced thereinto. The samples were passed through the curing chamber once more while being cured by the mercury lamps.

Table 3 summarizes compositions of various substrate layers and coatings where "phr" represents "parts per hundred resin."

TABLE 3

Layer Compositions

| Sample | Coating Tradename | Photo-Initiator (phr) | % Flatting Agent |
|---|---|---|---|
| 1 | CON 152A (Congoleum) | 0.1 | 0 |
| 2 | CON 154 (Congoleum) | 0.2 | 0 |
| 3 | CON 154 (Congoleum) | 0.2 | 10 |
| 4 | CON 154 (Congoleum) | 0.2 | 12 |
| 5 | CON 152A (Congoleum) | 0.1 | 10 |

The gloss of the landings and grout lines was measured at 60° as in Table 4.

TABLE 4

Gloss Differentials

| Photo-Initiators | Concentration (%) | Sample | Cure Conditions: Air (fpm), N$_2$ (fpm), No. of Passes | Gloss of Grout line (%) | Gloss of Landing (%) |
|---|---|---|---|---|---|
| DAROCURE 1173 | 20 | 1 | 60, 100, 2 | 5–7 | 5–15 |
| DAROCURE 1173 | 20 | 3 | 100, 100, 2 | 20–25 | 20–25 |
| DAROCURE 1173 | 20 | 5 | 100, 100, 2 | 12–13 | 15–17 |
| DAROCURE 1173 | 40 | 4 | 100, 100, 2 | 24–28 | 45–50 |
| DAROCURE 4265 | 20 | 1 | 60, 100, 2 | 5–10 | 75–85 |
| DAROCURE 4265 | 20 | 3 | 100, 100, 2 | 18–20 | 20–25 |
| DAROCURE 4265 | 20 | 5 | 100, 100, 2 | 10–15 | 40–45 |
| IRGACURE 184 | 20 | 3 | 100, 100, 2 | 20–25 | 20–25 |
| IRGACURE 184 | 20 | 5 | 100, 100, 2 | 10–15 | 15–25 |
| IRGACURE 500 | 40 | 1 | 60, 100, 2 | 5–15 | 85–90 |
| IRGACURE 500 | 40 | 3 | 100, 100, 2 | 20–25 | 20–25 |
| IRGACURE 500 | 40 | 5 | 100, 100, 2 | 12–14 | 18–20 |
| IRGACURE 651 | 50 | 4 | 100, 100, 2 | 18–20 | 40–50 |
| IRGACURE 651 | 70 | 4 | 100, 100, 2 | 28–33 | 45–50 |
| IRGACURE 907 | 20 | 1 | 60, 100, 2 | 5–15 | 80–85 |
| IRGACURE 907 | 20 | 3 | 100, 100, 2 | 20–25 | 35–45 |
| IRGACURE 907 | 20 | 5 | 100, 100, 2 | 10–15 | 55–60 |
| TPO | 40 | 1 | 60, 100, 2 | 10–15 | 85–90 |
| TPO | 40 | 3 | 100, 100, 2 | 20–25 | 30–40 |
| TPO | 40 | 4 | 100, 100, 2 | 25–30 | 45–55 |
| TPO | 40 | 5 | 100, 100, 2 | 5–15 | 60–65 |
| TPO | 20 | 3 | 100, 100, 2 | 20–25 | 45–55 |
| TPO | 20 | 5 | 100, 100, 2 | 10–15 | 55–65 |
| TPO | 20 | 1 | 60, 100, 2 | 5–20 | 80–90 |
| TPO-L | 20 | 1 | 60, 100, 2 | 5–15 | 80–85 |
| TPO-L | 20 | 3 | 100, 100, 2 | 15–20 | 35–40 |
| TPO-L | 20 | 5 | 100, 100, 2 | 8–10 | 35–40 |

As manifest in the right two columns of Table 4, all photo-initiators tested in this Example produced differential gloss (for example, increased gloss in the landings) in samples 1, 4, and 5. However, sample 3 did not yield a differential gloss with three of the photo-initiators and showed only very slight differentials with the other five photo-initiators. This result was likely to be attributed to the combinational effect of very high concentration of the photo-initiators and low concentration of the flatting agent, which would render this coating less sensitive to the presence of photo-initiator in the ink layers.

Sample 1 did not contain any flatting agent and produced the largest gloss differential. Sample 1 formed micro-wrinkles and resulted in extremely low gloss, for example, 5% to 15%. When the sample included a higher concentration of the photo-initiators, however, it did not produce micro-wrinkles and, therefore, formed a smooth, high gloss surface.

Sample 5 contained the flatting agent, had a higher concentration of the photo-initiator, and produced the micro-wrinkles. Lowered gloss of sample 5 was believed to result from a combinational effect of the high concentration of the photo-initiator (which produced the micro-wrinkles on its surface) and the inclusion of the flatting agent.

Sample 4 showed high gloss due to the faster polymerization or curing rates which decreased the concentration gradient of the flatting agent in the coatings. Increasing the concentration of the photo-initiators in the ink layers in this Example did not result in a significant increase in gloss in the landings.

EXAMPLE 2

This Example demonstrates the use of photo-inhibitors which decrease the rate of polymerization reaction. The substrate layer and the ink formulation were provided by following the procedure described in Example 1. The photo-inhibitors of Table 5 were then added to the ink formulation in various concentrations ranging from 20% to 40%.

TABLE 5

Ink Formulation

| Trade Name | Manufacturer | Chemical Name | Physical State at 23° C. |
|---|---|---|---|
| SR 339 | Sartomer | 2-phenoxyethyl acrylate | liquid |
| SR 348 | Sartomer | ethoxylated diphenol A dimethacrylate | liquid |
| M-HQ | Adlrich | methyl hydroquinone | solid |
| 4-MP | Adlrich | 4-methoxyphenol | solid |
| BHT | Adlrich | butylated hydroxy toluene | solid |

The ink formulation was printed on top of the substrate layer to form the ink layers in a brick pattern in a manner opposite to that of Example 1. That is, the ink formulation was gravure printed only on the grout lines that corresponded to the areas formed between the landings of the brick pattern but not on the landings themselves. The resulting ink layers were dried in air for at least one hour at room temperature or higher. Monomers having low polymerization reaction constant such as 2-phenoxy-ethyl acrylate and ethoxylated diphenol A dimethacrylate were also added to the ink formulation.

The samples were then placed in the curing chamber and the monomers and/or oligomers of the top curable layer were in-situ polymerized according to the procedure of Example 1, except that they were passed inside the curing chamber 3 to 4 times in the inert atmosphere. Table 6 summarizes and compares the gloss of the cured samples in their landings and grout lines.

TABLE 6

Gloss Differentials from Photo-Inhibitors

| Ink Additive | Concentration (%) | Sample | Gloss of Grout line (%) | Gloss of Landing (%) |
|---|---|---|---|---|
| SR 339 | 40 | 4 | 3–5 | 25–35 |
| SR 339 | 40 | 2 | 5–15 | 70–80 |
| SR 348 | 40 | 4 | 3–5 | 20–30 |
| SR 348 | 40 | 2 | 5–15 | 75–85 |
| M-HQ | 20 | 3 | 15–16 | 20–25 |
| 4-MP | 20 | 3 | 8–11 | 20–25 |
| BHT | 20 | 3 | 10–12 | 20–25 |

All tested ink formulations reduced gloss of the grout lines in samples 2, 3, and 4. The photo-inhibitors such as SR 339 and SR 348 all produced the micro-wrinkles, and the greatest gloss differential was achieved when flatting agent was not included in the coatings of the samples. Other the three photo-inhibitors such as M-HQ, 4-MP and BHT resulted in lower gloss which was believed to result from an increased migration of the flatting agent due to the reduction in the rate of the polymerization reaction.

EXAMPLE 3

This Example demonstrates the use of various curing agents to provide differential gloss coverings and compares their effects on their gloss differentials. In particular, the method of this Example is preferably directed to provide differential gloss tiles, for example., high-end "no wax" tiles.

PVC resin, plasticizers, pigments, and limestone filler such as calcium carbonate (preferably in a high concentration, for example, about 80%) were mixed in a blender held at a pre-selected temperature, for example, ranging from 115° F. to 135° F. The blended powder effluent was transferred to a continuous mixer held at 320° F. to 340° F. where thermoplastic limestone-filled resin was fused (i.e. entangling polymer chains) to provide tiles of various sizes. The tiles were passed through to a calendering roll, where the limestone-filled resin was partially softened and/or re-fused to form a continuous sheet of a substrate base layer having a thickness ranging from 116 mils to 118 mils at an exit temperature ranging from 250° F. to 270° F.

A substrate ink layer was provided by printing a suitable ink formulation on a PVC film having a thickness of about 2 mil or on a transfer paper of about 0.5 mil in a pre-selected design pattern. Thereafter the substrate ink layer was laminated onto the substrate base layer in a nip station. When the ink formulation was printed on the transfer paper, the lamination process transferred the ink formulation from the transfer paper to the substrate base layer. The transfer paper was immediately removed in a subsequent re-wind step.

The continuous sheet of the substrate ink layer and substrate base layer was conveyed to another nip station and a cap film (i.e., a wear layer) was laminated thereto. The cap film was a PVC film of about 3 mil in thickness and designed to protect the underlying substrate layers from mechanical wearing and/or from other damages. Compared with the foregoing thermal lamination of the substrate ink layer, this lamination process was mainly a pressure lamination utilizing nip pressure and high temperature of the incoming substrate ink and base layers. Accordingly, the laminating rolls themselves were not separately heated.

In general, the PVC cap film formed the uppermost layer for the tiles that would require periodic waxing. For the "no-wax" tiles, however, a top coat layer was applied over the cap film to provide desirable durability and, therefore, to obviate the need for a sacrificial wax layer. The top coat layer was generally made of thermosetting polymers. Regardless of their end use as the waxed or no-wax tiles, the continuous sheet of the cap film, substrate ink layer, and substrate base layer was optionally embossed mechanically. The resulting sheet was punched into tile samples having various dimensions ranging from 6" to 24", for example, 12" by 12" or 14" by 14" tile samples using a metal die. Edges punched out of the continuous sheet were recycled back into the mixing process for the substrate base layer.

The ink film was separately provided by providing the ink formulations of the above Examples 1 and 2 and by gravure printing such on top of the PVC cap film in a pre-selected pattern. The printed ink film was then dried as in Examples 1 and 2 and laminated onto the continuous sheet of the PVC/limestone layers by exposing the printed side at 260° F. for about 5 minutes at 10 psi. About 1 to 3 mil-thick layer of the curable substances described in Table 2 was then coated on the continuous sheet of the ink/PVC/limestone layers using an air knife or a curtain coater as described in Example 1. The samples were then cured in the curing chamber in air while illuminated by two halogen bulbs at 300 W/in$^2$, and then in an oxygen-free environment (i.e., nitrogen) at various speeds and passes.

The samples were annealed at 110° F. to 125° F. for up to two days to remove processing stresses and to ensure dimensional stability. Edges were ground to provide smoothness for proper field installation. A thermosetting urethane back coat layer was applied with a roll coater to balance the curling stress imparted on the tile samples by the top polymer layer. Layer configuration of the final product is given in Table 7.

TABLE 7

Typical Residential Vinyl Tile Construction

| Layer | Gauge/Thickness (mil) |
|---|---|
| Back Coat (polyurethane) | 0.5–2 |
| Substrate Base layer | 50–160 |
| Substrate Ink layer | <0.5 or 2 |
| Cap film | 2–5 |
| Top Curable Layer/Top Polymer Layer | 1–3 |

The tile samples were tested to analyze the effects of different curing agents on glosses in different regions of the top polymer layer of the samples. Table 8 summarizes the gloss of the grout lines and landings of the samples.

TABLE 8

Effects of Photo-Initiators and Photo-Inhibitors on Gloss Differential on Vinyl Tile Samples

| Ink Additives | Concentration (%) | Sample | Cure Conditions: Air (fpm), N₂ (fpm), Passes | Gloss in Grout line (%) | Gloss in Landing (%) |
|---|---|---|---|---|---|
| TPO | 40 | 1 | 60, 100, 2 | 10–20 | 70–85 |
| TPO | 40 | 5 | 60, 100, 2 | 13–18 | 18–20 |
| TPO | 40 | 5 | 100, 100, 2 | 20–22 | 20–25 |
| TPO | 30 | 1 | 60, 100, 2 | 10–15 | 80–85 |
| TPO | 30 | 5 | 60, 100, 2 | 15–18 | 18–25 |
| TPO | 20 | 4 | 60, 100, 2 | 10–15 | 80–85 |
| TPO | 20 | 4 | 70, 80, 2 | 80–85 | 80–85 |
| TPO | 20 | 4 | 60, 100, 2 | 17–18 | 20–25 |
| TPO | 40 | 4 | 100, 100, 2 | 22 | 27 |
| TPO | 30 | 4 | 100, 100, 2 | 26 | 33 |
| TPO | 20 | 4 | 100, 100, 2 | 22 | 25 |
| IRGACURE 500 | 40 | 1 | 60, 100, 2 | 5–15 | 75–85 |
| IRGACURE 651 | 70 | 1 | 100, 100, 2 | 25–30 | 25–30 |
| IRGACURE 907 | 20 | 1 | 60, 100, 2 | 10–20 | 75–85 |
| DAROCURE 1173 | 20 | 4 | 100, 100, 2 | 20–25 | 20–25 |
| DAROCURE 4265 | 20 | 1 | 60, 100, 2 | 5–10 | 50–55 |
| BHT | 20 | 4 | 100, 100, 2 | 20–25 | 20–25 |
| BHT | 40 | 4 | 100, 100, 2 | 20–25 | 20–25 |
| SR 339 | 40 | 2 | 60, 100, 2 | 75–85 | 75–85 |
| SR 348 | 40 | 2 | 60, 100, 2 | 50–55 | 75–85 |

The results showed that several curing agents did manifest a differential gloss on the flexible sheet vinyl (for example, DAROCURE 1173 and BHT) but did not produce any in tile samples. This indicated that the lamination process may have reduced or eliminated the effectiveness of the curing agents such as the photo-initiators and/or photo-inhibitors contained in the ink layer. The loss of effectiveness was believed to result from the diffusion of the curing agents into the PVC cap film during the lamination process which was performed at high temperature, for example, 260° F. Unlike the sheet vinyl process, the ink layer must survive a lamination process step for the PVC cap film. Thus, the ink formulation was to be preferably printed on the PVC cap film in a separate process.

These results also indicated that the coating type strongly influenced the effectiveness of the photo-initiators. For 40% TPO in the ink layer, sample 1 produced a much larger gloss differential in its coating than that of sample 5, presumably due to the very low inherent gloss of this coating. The conditions during the curing process also strongly affected the gloss differential. For sample 5 where its ink layer contained 20% TPO, the gloss differential could be eliminated by changing the pass speeds in the curing chamber, for example, that in the air and nitrogen atmosphere. In addition, the concentration of TPO in the ink layer was found to have a negligible effect on the gloss differential of samples 1, 4, and 5 in the range of 20–40% TPO.

The foregoing methods and/or the differential gloss coverings fabricated thereby may also be modified without departing from the scope of the present invention. It is to be understood that methods and examples herein are illustrative only and not intended to be limiting. In addition, while various embodiments of the invention have been described in conjunction with the detailed description thereof, the foregoing is intended only to illustrate and not to limit the scope of the present invention, which is defined by the scope of the appended claims. Other equivalent embodiments, aspects, advantages, and modifications are within the scope of the following claims. All U.S. patents and patent applications referenced herein are hereby incorporated in their entirety by reference.

What is claimed is:

1. A method for providing a differential gloss covering, comprising:

providing a backing substrate;

depositing an ink formulation comprising a curing agent comprising a polymerization promoter over at least a first area of a top side of said backing substrate to form an ink layer;

coating said top side of said backing substrate with a radiation curable formulation to form a top curable layer;

diffusing at least a portion of said curing agent into said top curable layer;

curing said top curable layer to form a cured top layer and thereby forming a differential gloss covering having a first surface portion above said first area of said top of said backing substrate having a first gloss and a second surface portion having a second gloss that is less than said first gloss.

2. The method of claim 1, wherein said backing substrate comprises a backing layer, a gel layer, and a substrate ink layer.

3. The method of claim 1, wherein said polymerization promoter is selected from the group consisting of 2-hydroxy-2-methyl-1-phenyl-propan-1-one, 1-hydroxy-cyclohexyl-phenyl-ketone, 2,2-dimethoxy-2-phenylacetophenone, 2-methyl-1-(4-methylthio-phenyl)-2-morpholino-propanone-1, benzophenones, 2,4,6-trimethyl-benzoyl-diphenyl-phosphine-oxide, and mixtures thereof.

4. The method of claim 1, further comprising adding a flatting agent to said top curable layer.

5. The method of claim 4, further comprising causing said flatting agent to move toward said top side of said backing substrate.

6. The method of claim 5, wherein said polymerization promoter is selected from the group consisting of 2-hydroxy-2-methyl-1-phenyl-propan-1-one, 1-hydroxy-cyclohexyl-phenyl-ketone, 2,2-dimethoxy-2-phenylacetophenone, 2-methyl-1-(4-methylthio-phenyl)-2-morpholino-propanone-1, benzophenones, 2,4,6-trimethyl-benzoyl-diphenyl-phosphine-oxide, and mixtures thereof.

7. A method for providing a differential gloss covering, comprising:
   providing a backing substrate;
   depositing an ink formulation comprising a curing agent comprising a polymerization inhibitor over at least a first area of a top side of a backing substrate to form an ink layer;
   coating said top side of said backing substrate with a radiation curable formulation to form a top curable layer;
   diffusing at least a portion of said curing agent into said top curable layer;
   curing said top curable layer to form a cured top layer and thereby forming a differential gloss covering having a first surface portion above said first area of said top of said backing substrate having a first gloss and a second surface portion having a second gloss that is greater than said first gloss.

8. The method of claim 7, wherein said backing substrate comprises a backing layer, a gel layer, and a substrate ink layer.

9. The method of claim 7, wherein said polymerization inhibitor is selected from the group consisting of phenyl-ether-acrylates, ethoxylated-bisphenol-A derivatives, hydroquinones, butylated hydroxy toluenes, methacrylates, and mixtures thereof.

10. The method of claim 7, further comprising adding a flatting agent to said top curable layer.

11. The method of claim 10, further comprising causing said flatting agent to move away from said top side of said backing substrate.

12. The method of claim 11, wherein said polymerization inhibitor is selected from the group consisting of phenyl-ether-acrylates, ethoxylated-bisphenol-A derivatives, hydroquinones, butylated hydroxy toluenes, methacrylates, and mixtures thereof.

13. A method for providing a differential gloss covering, comprising:
   depositing an ink formulation comprising a curing agent over at least a first area of a top side of a backing substrate;
   coating said top side of said backing substrate with a radiation curable formulation comprising substantially to form a top curable layer;
   diffusing at least a portion of said curing agent into said top curable layer;
   exposing said top curable layer to radiation, thereby curing substantially all of said top curable layer and forming a top cured layer having a first surface portion having a first gloss and a second surface portion having a second gloss different from said first gloss.

14. The method of claim 13, wherein said backing substrate comprises a backing layer, a gel layer, and a substrate ink layer.

15. The method of claim 13, wherein said curing agent comprises a polymerization promoter.

16. The method of claim 15, wherein said polymerization promoter is selected from the group consisting of 2-hydroxy-2-methyl-1-phenyl-propan-1-one, 1-hydroxy-cyclohexyl-phenyl-ketone, 2,2dimethoxy-2-phenylacetophenone, 2-methyl-1-(4-methylthio-phenyl)-2-morpholino-propanone-1, benzophenones, 2,4,6-trimethyl-benzoyl-diphenyl-phosphine-oxide, and mixtures thereof.

17. The method of claim 13, wherein said curing agent comprises a polymerization inhibit r.

18. The method of claim 17, wherein said polymerization inhibitor is selected from the group consisting of phenyl-ether-acrylates, ethoxylated-bisphenol-A derivatives, hydroquinones, butylated hydroxyl toluenes, methacrylates, and mixtures thereof.

19. The method of claim 13, wherein said first gloss has a higher gloss level than said second gloss.

20. The method of claim 13, wherein said second gloss has a higher gloss level than said first gloss.

21. The method of claim 13, further comprising adding a flatting agent to said top curable layer.

22. The method of claim 21, wherein said curing agent comprises a polymerization promoter and further comprising causing said flatting agent to move toward said top side of said banking substrate.

23. The method of claim 22, wherein said polymerization promoter is selected from the group consisting of 2-hydroxy-2-methyl-1-phenyl-propan-1-one, 1-hydroxy-cyclohexyl-phenyl-ketone, 2,2-dimethoxy-2-phenylacetophenone, 2-methyl-1-4-methylthio-phenyl)-2-morpholino-propanone-1, benzophenones, 2,4,6-trimethyl-benzoyl-diphenyl-phosphine-oxide, and mixtures thereof.

24. The method of claim 21, wherein said curing agent comprises a polymerization inhibitor and further comprising causing said flatting agent to move away from said top side of said backing substrate.

25. The method of claim 24, wherein said polymerization inhibitor is selected from the group consisting of phenyl-ether-acrylates, ethoxylated-bisphenol-A derivatives, hydroquinones, butylated hydroxy toluenes, methacrylates, and mixtures thereof.

26. The method of claim 13, wherein said exposing comprises exposing said top curable layer to radiation in an atmosphere comprising oxygen; and exposing said top curable layer to radiation in an inert atmosphere.

27. The method of claim 13, wherein said radiation curable formulation comprises a photoinitiator.

28. The method of claim 13, wherein said radiation curable formulation comprises urethane.

* * * * *